(12) United States Patent
Bortenschlager et al.

(10) Patent No.: US 8,748,553 B2
(45) Date of Patent: Jun. 10, 2014

(54) SELF-ADHESIVE SILICONE ELASTOMERS

(75) Inventors: Martin Bortenschlager, Bergkirchen (DE); Thomas Frese, Burghausen (DE); Silvia Jung-Rossetti, Munich (DE); Maria Leute, Munich (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/813,872

(22) PCT Filed: Aug. 8, 2011

(86) PCT No.: PCT/EP2011/063607
§ 371 (c)(1),
(2), (4) Date: Feb. 1, 2013

(87) PCT Pub. No.: WO2012/019992
PCT Pub. Date: Feb. 16, 2012

(65) Prior Publication Data
US 2013/0130041 A1    May 23, 2013

(30) Foreign Application Priority Data
Aug. 9, 2010 (DE) .................. 10 2010 039 085

(51) Int. Cl.
*C08G 77/08* (2006.01)

(52) U.S. Cl.
USPC .................. 528/15; 528/26; 528/31; 525/478

(58) Field of Classification Search
USPC .................. 528/15, 26, 31; 525/478
See application file for complete search history.

(56) References Cited

U.S. PATENT DOCUMENTS

| | | |
|---|---|---|
| 5,023,288 A | 6/1991 | Hirai et al. |
| 5,312,855 A | 5/1994 | Okami |
| 6,252,028 B1 * | 6/2001 | Fehn et al. ............ 528/15 |
| 6,268,300 B1 | 7/2001 | Hernandez et al. |
| 6,297,305 B1 | 10/2001 | Nakata et al. |
| 6,743,515 B1 | 6/2004 | Muller et al. |
| 2001/0011117 A1 | 8/2001 | Pesch et al. |
| 2003/0236380 A1 | 12/2003 | Fehn et al. |
| 2005/0042462 A1 | 2/2005 | Fehn et al. |
| 2007/0264510 A1 | 11/2007 | Fehn |
| 2010/0210794 A1 | 8/2010 | Frese et al. |

FOREIGN PATENT DOCUMENTS

| | | |
|---|---|---|
| EP | 0143994 A2 | 6/1985 |
| EP | 0601882 A1 | 6/1994 |
| EP | 0601883 A2 | 6/1994 |
| EP | 0686671 A2 | 12/1995 |
| EP | 0728825 B1 | 8/1996 |
| JP | 2-28280 A | 1/1990 |
| JP | 3-163183 A | 7/1991 |
| JP | 2000-80276 A | 3/2000 |
| JP | 2000-191915 A | 7/2000 |

OTHER PUBLICATIONS

Naoki Omura et al., "Synthesis Characterization and Properties of Stars Consisting of Many Polyisobutylene Arms Radiating From a Core of Condensed Cyclosiloxanes", Macromolecules No. 11, Copyright 1997, American Chemical Society, vol. 30, pp. 3204-3214.

* cited by examiner

*Primary Examiner* — Margaret Moore
(74) *Attorney, Agent, or Firm* — Brooks Kushman P.C.

(57) ABSTRACT

Composite materials contain a silicone addition crosslinkable silicone elastomer composition comprising an organopolysiloxane having aliphatic unsaturation, an Si—H functional cyclic organopolysiloxane, a hydrosilylation catalyst, together with specific adhesion promoters, applied to a substrate material.

14 Claims, No Drawings

SELF-ADHESIVE SILICONE ELASTOMERS

CROSS-REFERENCE TO RELATED APPLICATIONS

This application is the U.S. national phase of PCT Appln. No. PCT/EP2011/063607 filed Aug. 8, 2011 which claims priority to German application 10 2010 039 085.2 filed Aug. 9, 2010, the disclosures of which are incorporated in their entirety by reference herein.

BACKGROUND OF THE INVENTION

1. Field of the Invention

The present invention relates to addition-crosslinking silicone compositions which comprise an adhesion promoter, to silicone elastomers prepared from the silicone compositions (S), to a process for preparing the addition-crosslinking silicone compositions, to composite materials comprising the addition-crosslinking silicone elastomers, and to a process for producing composite materials comprising the addition-crosslinking silicone elastomers.

2. Description of the Related Art

Composite articles composed of different materials are becoming increasingly more important as engineering materials. A principle requirement for these materials is a bond between the individual substrate materials that is strong and is durable under the corresponding service conditions.

Possible substrate materials include for example metals, glasses, ceramics, organic polymers, or biological materials. Silicones and crosslinkable silicone compositions, in particular, are playing an increasing part as substrate materials. On account of their adhesive nature, however, these silicones and silicone compositions make it difficult to achieve a durable bond.

Numerous technologies for producing a strong and durable join between silicones and other substrate materials are known.

Fundamentally there exists the possibility of modifying the chemical and physical nature of the substrate material in order to improve the strength of adhesion between the silicone and the substrate material.

One exemplary process is the pretreatment of the surface of the substrate materials by UV irradiation, flame treatment, corona treatment, or plasma treatment. In the course of such pretreatment steps, the surface or near-surface layer of the substrate materials becomes activated—that is, functional groups, primarily polar groups, are created that allow a joint to come about, and that in this way contribute to the realization of a durable composite material.

Another way to produce durably strong silicone composite materials is the application of priming systems, known as primers, to the substrate material. Such primers, however, often contain solvents as well as adhesion-promoting additives, and these solvents must be removed again following application to the substrate material.

A disadvantage of all of these techniques is that the pretreatment of the substrates necessitates an additional operating step.

This disadvantage can be obviated by providing suitable functional groups in the volume of the substrate material, and/or at the surface of the silicone and/or substrate material, which contribute to the development of adhesion in the production of the composite article.

EP0601882 describes for example, a composite material comprising a silicone elastomer and an organic plastic, wherein a polycarbonate substrate material which comprises additional aliphatically unsaturated groups is used.

EP0143994, for its part, describes providing an organohydrogenpoly-siloxane-containing organic plastic which, after vulcanization with an addition-crosslinking silicone composition, allows the production of a durably strong composite material.

However, the procedure just described necessitates a structural modification to at least one of the substrates, and this may adversely affect the physical and chemical properties. Moreover, chemical modification of polymers in some cases is associated with a considerable cost and complexity.

Another way of achieving adhesion between a silicone and a polymeric substrate is to add specific additives and/or specific crosslinkers, known as adhesion promoters. These additives, admixed to the uncrosslinked silicone compositions, develop adhesion to a substrate material during and/or after vulcanization, sometimes only after storage. As a result, there is no decisive intervention in the chemical nature of the materials participating in the bond. Generally speaking, moreover, there is no need for any further pretreatment of the substrate materials.

EP0875536 describes a self-adhesive silicone rubber composition which comprises at least one alkoxysilane and/or alkoxysiloxane containing an epoxy group, and also a crosslinker having at least 20 SiH groups, with the proviso that the SiH:SiVi ratio is at least 1.5.

An additive which is particularly preferred is glycidyloxypropyltrimethoxysilane (Glymo®), which allows relatively high strengths of adhesion to be obtained in composite materials, especially with certain organic plastics. The crosslinkers with 30 SiH groups per molecule that are described in the examples of EP0875536, however, have the disadvantage that crosslinkers with such high functionality lead to a considerable reduction in shelf life, as a result of viscosity increases (stiffening), and hence that, ultimately, the processing quality of the silicone compositions is adversely affected as well. A critical disadvantage of the use of epoxy-functional alkoxysilanes/siloxanes is the elimination of the alcohol group(s), the use of reactive and polar groups, and, in the case of functional alkoxysilanes, the problem of "efflorescence" and "exudation". The elimination of the alcohol may on the one hand be detrimental to effective adhesion, since the alcohol accumulates at the surface of the silicone and hence also at the interface with the substrate, thereby impairing contact between silicone surface and substrate surface. Furthermore, it is preferred to use methoxy-silanes, which release methanol, which is classified as toxic. Furthermore, the liberation of volatile cleavage products (alcohol elimination) is accompanied by observation of a not inconsiderable contraction of the silicone elastomer, and this, generally, is undesirable.

EP1106662 describes self-adhesive, addition-crosslinking silicone compositions comprising an organosilicon compound which contains not only an epoxy group but also a hydrolyzable group, and an organohydrogenpolysiloxane which has at least one aromatic $C_6$ ring, leading to very good strength of adhesion on numerous organic plastics and various metals. The organohydrogenpolysiloxane here functions both as an adhesion promoter and as a crosslinker. A disadvantage of the compositions described in EP1106622, however, is that the stated additives, first, bring about accelerated SiH breakdown on account of their relatively high reactivity, and, moreover, the crosslinking rate is reduced (inhibition effect).

EP1510553 discloses self-adhesive, addition-crosslinking silicone rubber compositions comprising (A) an organohydrogenpolysiloxane, (C) an adhesion-promoting compound of the general formula $(R^{12})_5\text{Ph-X}_r\text{-Ph}(R^{12})_5$, and, as additional adhesion promoter (D), an organopolysiloxane which carries at least one terminal SiH group. These compositions, however, have the disadvantage that Si—H-terminal polymers, which are frequently also used for chain extension, have an adverse effect on the quality of processing in an injection-molding operation, this being manifested in a narrower processing window.

EP0601883 describes self-adhesive, addition-crosslinking silicone rubber compositions which comprise a silane group or siloxane group as an adhesion promoter, which comprise at least one aromatic group and also at least one SiH function. The self-adhesive, addition-crosslinking silicone rubber compositions described are notable for effective adhesion to the stated organic plastics and for a low strength of adhesion to metals. The storage-stable preparation of the adhesion promoters recited in the examples, however, is considered fundamentally to be very complex and therefore costly, and this is ultimately reflected in a reduced economic efficiency.

EP0686671A2 describes a self-adhesive, addition-crosslinking silicone composition which uses no special adhesion promoters, since the adhesion-promoting constituent either is an organohydrogenpolysiloxane which possesses on average per molecule at least two SiH groups and at least 12 mol % of whose monovalent Si-bonded radicals are composed of hydrocarbon radicals having an aromatic ring, or is a compound of this kind which possesses on average per molecule at least one SiH group and which comprises a group consisting of two aromatic rings, the two aromatic rings being separated from one another by $-R^{13}R^{14}\text{Si}-$, $-R^{13}R^{14}\text{SiO}-$, $-OR^{13}R^{14}\text{SiO}-$ or $-R^{13}R^{14}\text{SiOR}^{13}R^{14}\text{Si}-$, the radicals $R^{13}$ and $R^{14}$ being monovalent hydrocarbon radicals. The adhesion-promoting constituent may thus also be the crosslinker of the silicone elastomer composition. This composition produces good adhesion on organic plastics, especially acrylonitrile-butadiene-styrene (ABS) copolymer, but at the same time exhibits easy demoldability from metals. The high level of radicals comprising aromatic rings in the SiH-containing, adhesion-promoting constituent, of more than 12%, however, results in a considerable incompatibility with the other constituents of the addition-crosslinking silicone elastomer composition. This leads on the one hand to partial separation (exudation) during storage, hence necessitating repeated homogenization of the component comprising this constituent, prior to use. This incompatibility, which is evident even in a milky haze of the uncrosslinked composition, is also manifested in a significantly reduced transparency on the part of the silicone elastomer components produced from the material. Where the adhesion-promoting constituent also functions as a crosslinker of the silicone composition, the incompatibility results in vulcanization defects, which lead to inhomogeneous network formation and deficient mechanical vulcanizate properties. In order to circumvent these vulcanization defects, it is necessary, in addition to the adhesion-promoting SiH-containing constituent, to use an SiH-containing crosslinker which is fully compatible with the silicone composition—but this has the consequence of other disadvantages, such as increased values for compression set and increased exudation tendency on the part of the adhesion-promoting constituent, for example. The high level of radicals comprising aromatic rings in the SiH-containing, adhesion-promoting constituent, of more than 12 mol %, also causes a severe structural viscosity of the silicone elastomer composition, and in many applications this is undesirable, as in the case of the injection molding of liquid silicone rubber, for example.

EP0728825B1 describes self-adhesive silicone rubbers which as crosslinker comprise $R_3\text{Si}(\text{OSi}(R)H)_n\text{OSiR}_3$, $-(\text{OSi}(R)H)_n-$ or $R_{4-1}\text{Si}(\text{OSi}(R)_2H)_1$ with n being at least 3 and 1 being 3 or 4, and a specific adhesion promoter. There is therefore explicitly no description of copolymers which contain $H(R)\text{SiO}_{2/2}$ and $(R)_2\text{SiO}_{2/2}$ units. The specified adhesion promoter is a compound which comprises at least one aliphatically unsaturated group and at least two phenylene groups.

DE102007044789 describes self-adhesive, addition-crosslinking silicone compositions which exhibit very good adhesion to engineering plastics, especially plastics based on bisphenol A. The adhesion promoter used in this case is a mixture of cyclic organohydrogensiloxanes and a compound having at least two phenyl units and one alkenyl unit.

According to the prior art, there are a large number of known self-adhesive crosslinkable silicone compositions. A problem, however, is the fact that the majority of the adhesion-enhancing additives which are added to the silicone compositions, comprise phenyl groups or alkoxysilyl groups, and these additives, and/or their hydrolysis products, are therefore toxic or injurious to health. As a result, their use in industrial materials is limited. For medical, cosmetic, or near-food applications, these materials are unsuitable.

SUMMARY OF THE INVENTION

A subject of the invention is addition-crosslinking silicone compositions (S) comprising
(A) at least one diorganopolysiloxane of the general formula (I)

$$R^1_a R^2_b \text{SiO}_{(4-a-b)/2} \quad (I)$$

in which
$R^1$ is hydroxyl radical or a monovalent, unsubstituted or halogen-substituted hydrocarbon radical having 1 to 20 carbon atoms, which is free of aliphatically unsaturated groups and may contain O, N, S, or P atoms,
$R^2$ is a monovalent, aliphatically unsaturated, unsubstituted or halogen-substituted hydrocarbon radical having 2 to 10 carbon atoms, which may contain O, N, S, or P atoms, and
b denotes values from 0.0001 to 2, with the proviso that $1.5<(a+b)\leq3.0$, and that per molecule there are on average at least two aliphatically unsaturated radicals $R^2$, and that the viscosity of the diorganopolysiloxanes (A) as determined at 25° C. is 1 to 40,000,000 mPa·s,
(B) at least one cyclic organohydrogenpolysiloxane of the general formula (II), $$(\text{SiHR}^7\text{O})_g(\text{SiR}^8\text{R}^9\text{O})_h \quad (II)$$

where
$R^7$ is hydrogen or denotes the definitions of $R^8$, and
$R^8$ and $R^9$ are
  (a) a monovalent aliphatically saturated hydrocarbon radical having 1 to 20 carbon atoms, or
  (b) an unsubstituted or halogen-substituted monovalent hydrocarbon radical having 6 to 20 carbon atoms, which contains at least one aromatic $C_6$ ring, or
  (c) a monovalent cycloaliphatic unsubstituted or halogen-substituted hydrocarbon radical having 3 to 20 carbon atoms, or
  (d) a halogen-substituted, saturated, monovalent hydrocarbon radical having 2 to 20 carbon atoms, which may contain O, N, S, or P atoms, or
  (e) a linear, cyclic, or branched radical containing Si atoms, which may contain one or more Si-bonded hydrogen atoms, g is a number greater than or equal to 1, and
h is 0 or a positive number, preferably 0, 1, 2 and more preferably 0,
    with the proviso that the sum of g and h is a number greater than or equal to 4,
(C) at least one adhesion promoter of the general formula (III)

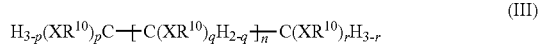
(III)

where
$R^{10}$ is hydrogen atom or a linear, branched, or cyclic aliphatic hydrocarbon radical having 1-30 carbon atoms, which may contain one or more C=C double bonds and functional groups Y,
X is selected from —$CH_2$—, —C(=O)—, —O—C(=O)—, —O—, —NH—C(=O)—, and —NH—C(=O)—O—,
Y is selected from carbonyl, ethers, esters, carboxylic acids, amides, acid amides, carbamates, ureas, urethanes, and alcohols,
n is 0 or a positive number,
p and r are each a number 0, 1, 2, or 3, and
q is a number 0, 1, or 2,
    with the proviso that the adhesion promoter (C) comprises at least two C=C double bonds, and
(D) at least one hydrosilylation catalyst.

DETAILED DESCRIPTION OF THE PREFERRED EMBODIMENTS

The addition-crosslinking silicone compositions (S) exhibit outstanding adhesion to common technical polymers, especially those based on bisphenol A. At the same time they contain no toxic constituents and therefore meet the stipulations for medical, cosmetic, or near-food applications.

In the addition-crosslinking silicone compositions (S), the components (A), (B), (C), and (D) may be one compound or a mixture of different compounds.

Examples of the radicals $R^1$ are alkyl radicals such as methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl, and octadecyl radicals; cycloalkyl radicals such as cyclopentyl, cyclohexyl, cycloheptyl, norbornyl, adamantylethyl, or bornyl radicals; aryl or alkaryl radicals, such as phenyl, ethylphenyl, tolyl, xylyl, mesityl, or naphthyl radicals; aralkyl radicals such as benzyl, 2-phenylpropyl, or phenylethyl radicals, and also derivatives of the foregoing radicals that are halogenated and functionalized with organic groups, such as 3,3,3-trifluoropropyl, 3-iodopropyl, 3-isocyanatopropyl, amino-propyl, methacryloyloxymethyl, or cyanoethyl radicals. Preferred radicals $R^1$ contain 1 to 10, more preferably 1 to 6 carbon atoms and also, optionally, halogen substituents. Particularly preferred radicals $R^1$ are the methyl, phenyl, and 3,3,3-trifluoropropyl radicals, more particularly the methyl radical.

The radicals $R^2$ are amenable to a hydrosilylation reaction. Examples thereof are alkenyl and alkynyl radicals such as the vinyl, allyl, isopropenyl, 3-butenyl, 2,4-pentadienyl, butadienyl, 5-hexenyl, undecenyl, ethynyl, propynyl, and hexynyl radicals; cycloalkenyl radicals such as the cyclopentenyl, cyclohexenyl, 3-cyclohexenylethyl, 5-bicycloheptenyl, norbornenyl, 4-cyclooctenyl, or cyclooctadienyl radicals; alkenylaryl radicals, such as the styryl or styrylethyl radicals, and also derivatives of the foregoing radicals that are halogenated and contain heteroatoms, such as the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl, or methacryloyloxy radical. Preferred radicals $R^2$ are the vinyl, allyl, and 5-hexenyl radicals, more preferably the vinyl radical.

For the diorganopolysiloxanes (A) of the general formula (I), the viscosity as determined at 25° C. is preferably 10 to 1,000,000 mPa·s. Depending on the nature of the self-adhesive, addition-crosslinking silicone composition (S), different viscosity ranges are preferred for the diorganopolysiloxanes (A). For compositions known as RTV-2 (room temperature vulcanizing) compositions, particularly preferred viscosities are from 100 to 10,000 mPa·s; for LSR (liquid silicone rubber), they are from 1000 to 500,000 mPa·s; and for HTV (high temperature vulcanizing), they are from 2000 to 40,000 mPa·s.

Examples of radicals $R^7$, $R^8$, and $R^9$ of the cyclic organohydrogenpolysiloxane (B) of the general formula (II) are Si-bonded hydrocarbon radicals having 1 to 10, more particularly 1 to 6, carbon atoms, especially the alkyl, aryl, and alkaryl radicals specified for $R^1$. Preferred radicals $R^7$, $R^8$, and $R^9$ are Si-bonded hydrogen, and the methyl, ethyl, propyl, butyl, octyl, cyclohexyl, phenyl, and 3,3,3-trifluoropropyl radicals.

Particularly preferred radicals $R^7$, $R^8$, and $R^9$ are Si-bonded hydrogen, the methyl radical, and the phenyl radical, of which Si-bonded hydrogen and the methyl group are the most preferred radicals.

The cyclic organohydrogenpolysiloxanes (B) are preferably copolymers comprising $H(CH_3)SiO_{2/2}$ and $(CH_3)_2SiO_{2/2}$ units, and homopolymers containing exclusively $H(CH_3)SiO_{2/2}$ units, and also mixtures thereof, the homooligomers being even more preferred.

Particularly preferred embodiments of the cyclic organohydrogenpolysiloxanes (B) are homopolymers, such as pentamethylcyclopentasiloxane $(SiMe(H)O)_5$ $(D_5^H)$ or hexamethylcyclohexasiloxane $(SiMe(H)O)_6$ $(D_6^H)$, or heptamethylcycloheptasiloxane $(SiMe(H)O)_7$ $(D_7^H)$, or octamethylcyclooctasiloxane $(SiMe(H)O)_8$ $(D_8^H)$, or mixtures of the homopolymers.

Mixtures of these preferred embodiments of the cyclic organohydrogenpolysiloxanes (B) preferably comprise comparatively small amounts of homopolymers such as trimethylcyclotrisiloxane $(SiMe(H)O)_3$ $(D_3^H)$ and tetramethylcyclotetrasiloxane $(SiMe(H)O)_4$ $(D_4^H)$, or mixtures thereof, and so the fraction of the sum total of these homopolymers in the cyclic organohydrogenpolysiloxane (B) is preferably less than 20% by weight, more preferably less than 10% by weight.

A further preferred embodiment of the cyclic organohydrogenpolysiloxane (B) is a compound of the general formula (II) with the proviso that the sum of g and h is a number greater than or equal to 5 and preferably not more than 20, more preferably not more than 10.

In a further preferred embodiment, the cyclic organohydrogenpolysiloxane (B) of the general formula (II) is free of aromatic groups.

Besides cyclic organohydrogenpolysiloxane (B), the addition-crosslinking silicone composition (S) may further comprise
(E) one or more organohydrogenpolysiloxanes of the general formula (IV)

(IV)

where
R³ is a monovalent aliphatically saturated hydrocarbon radical having 1 to 20 carbon atoms,
R⁴ (a) is a monovalent, unsubstituted or halogen-substituted hydrocarbon radical having 6 to 15 carbon atoms, which contains at least one aromatic $C_6$ ring, or
  (b) is a monovalent, unsubstituted or halogen-substituted, saturated hydrocarbon radical having 2 to 20 carbon atoms, in which individual carbon atoms may have been replaced by O, N, S or P atoms,
R⁵ is a divalent, unsubstituted or halogen-substituted hydrocarbon radical which is Si-bonded at both ends and has 6 to 20 carbon atoms, and in which individual carbon atoms may have been replaced by O, N, S, or P atoms,
c and f are positive numbers, and
d and e are zero or a positive number,
with the proviso that the sum (c+d+2e+f) is ≤3, the organohydrogenpolysiloxane (E) contains per molecule on average at least 3 SiH groups, and
that the viscosity of the organohydrogenpolysiloxane (E) as determined at 25° C. is 5 mPa·s to 5,000 mPa·s, and that the organohydrogenpolysiloxane (E) is not a cyclic organohydrogenpolysiloxane of the general formula $(SiHR^7O)_g$ $(SiR^8R^9O)_h$.

Examples of R³ are alkyl radicals, as recited above for R¹. Preferred radicals R³ are hydrocarbon radicals having 1 to 10 carbon atoms. A particularly preferred radical R³ is the methyl radical.

Examples of R⁴ have been recited above for R¹. Preferred radicals R⁴ are the phenyl radical and the 3,3,3-trifluoropropyl radical. A particularly preferred radical R⁴ is the phenyl radical.

Preferred radicals R⁵ correspond to the general formula (Z)

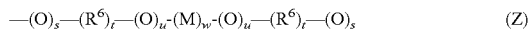

$$-(O)_s-(R^6)_t-(O)_u-(M)_w-(O)_u-(R^6)_t-(O)_s \quad (Z)$$

where
s, t, u, and w are the values 0, 1, or 2,
R⁶ is a divalent, unsubstituted or halogen-substituted hydrocarbon radical having 1 to 10 carbon atoms which free of aliphatically unsaturated groups and in which individual carbon atoms may have been replaced by O, N, S, or P atoms, such as, for example, —$CH_2$—, —$CH_2$—$CH_2$—, —$CH_2$—$CH_2$—$CH_2$—, —$CF_2$—, —$CH_2$—$CF_2$—, —$CH_2$—$CH(CH_3)$—, —$C(CH_3)_2$—, —$CH_2$—$C(CH_3)_2$—, —$C(CH_3)_2$—$CH_2$—, —$CH_2$—$CH_2$—O— or —$CF_2$—$CF_2$—O—, and
M is a divalent radical such as -Ph-, -Ph-O-Ph-, -Ph-S-Ph-, -Ph-$SO_2$-Ph-, -Ph-$C(CH_3)_2$-Ph-, -Ph-$C(CF_3)_2$-Ph-, -Ph-C(O)-Ph-, cyclohexylene, or norbornylene, where Ph denotes a phenylene group.

Particularly preferred radicals R⁵ are the phenylene radical and the norbornylene radical.

Examples of the organohydrogenpolysiloxanes (E) of the general formula (IV) are linear and branched organohydrogenpolysiloxanes, consisting preferably of units of the formulae $(CH_3)_3SiO_{1/2}$, $H(CH_3)SiO_{1/2}$, $H(CH_3)SiO_{1/2}$, $(CH_3)(C_6H_5)SiO_{2/2}$, $(C_6H_5)_2SiO_{2/2}$, $(C_6H_5)SiO_{3/2}$, $(CH_3)_2SiO_{2/2}$ or $O_{1/2}(CH_3)_2Si$—$C_6H_4$—$(CH_3)_2SiO_{1/2}$, or of mixtures thereof.

Particularly preferred organohydrogenpolysiloxanes (E) of the general formula (IV) are linear and branched organohydrogenpolysiloxanes which consist of units of the formulae $(CH_3)_3SiO_{1/2}$, $H(CH_3)SiO_{2/2}$, and $(CH_3)_2SiO_{2/2}$, or of mixtures of different such organohydrogenpolysiloxanes.

The organohydrogenpolysiloxane (E) of the general formula (IV) preferably contains on average 5 to 40 SiH groups per molecule. More preferably there are on average 10 to 25 SiH groups per molecule.

In one particularly preferred embodiment, the organohydrogenpolysiloxane (E) of the general formula (IV) is free of aromatic groups.

The viscosity of constituent (E) as measured at 25° C. is preferably 2 to 1000 mPa·s.

On account of the synthesis routes that are common in the prior art, and also on account of the inherent instability of SiH groups, especially at relatively high temperatures and/or in the presence of suitable catalysts and reactants, constituent (E) may contain a small amount, typically less than 100 ppm by weight, of Si-bonded OH groups.

Preferred embodiments of the organohydrogenpolysiloxanes (E) are for example
copolymers containing $H(CH_3)SiO_{2/2}$ and $(CH_3)_2SiO_{2/2}$ units having $(CH_3)_3SiO_{1/2}$ end groups,
copolymers containing $H(CH_3)SiO_{2/2}$ and $(CH_3)_2SiO_{2/2}$ units having $H(CH_3)_2SiO_{1/2}$ end groups,
copolymers containing $(Ph)_2SiO_{2/2}$ and $H(CH_3)SiO_{2/2}$ units having $(CH_3)_3SiO_{1/2}$ end groups,
copolymers containing $(Ph)SiO_{3/2}$, $(CH_3)_2SiO_{2/2}$ and $H(CH_3)Si_{2/2}$ units having $(CH_3)_3SiO_{1/2}$ end groups,
copolymers containing $(Ph)_2SiO_{3/2}$, $(CH_3)_2SiO_{2/2}$ and $H(CH_3)Si_{2/2}$ units having $(CH_3)_3SiO_{1/2}$ end groups,
copolymers containing $(Ph)(CH_3)SiO_{2/2}$, $(CH_3)_2SiO_{2/2}$ and $H(CH_3)Si_{2/2}$ units having $(CH_3)_3SiO_{1/2}$ end groups,
copolymers containing $(Ph)(CH_3)SiO_{2/2}$, $(CH_3)_2SiO_{2/2}$ and $H(CH_3)Si_{2/2}$ units having $H(CH_3)_2SiO_{1/2}$ end groups,
copolymers containing $(Ph)(CH_3)SiO_{2/2}$ and $H(CH_3)Si_{2/2}$ units having $(CH_3)_3SiO_{1/2}$ end groups,
copolymers containing —Si$(CH_3)_2$—$C_6H_4$—Si$(CH_3)_2O_{2/2}$, $(CH_3)_2SiO_{2/2}$ and $H(CH_3)HSiO_{1/2}$ units, and
copolymers containing —Si$(CH_3)_2$—$C_6H_4$—Si$(CH_3)_2O_{2/2}$ and $(CH_3)HSiO_{2/2}$ units.

Particularly preferred embodiments of the organohydrogenpolysiloxanes (E) are for example
copolymers containing $H(CH_3)SiO_{2/2}$ and $(CH_3)_2SiO_{2/2}$ units having $(CH_3)_3SiO_{1/2}$ end groups, and
copolymers containing $H(CH_3)SiO_{2/2}$ and $(CH_3)_2SiO_{2/2}$ units having $H(CH_3)_2SiO_{1/2}$ end groups.

Further particularly preferred are organohydrogenpolysiloxanes (E) which consist of —Si$(CH_3)H$—O— and —Si$(CH_3)_2$—O— units with a molar ratio of 3:1 having $(CH_3)_3Si$—O end groups, or of —Si$(CH_3)H$—O— and —Si$(CH_3)_2$—O— units with a molar ratio of 1:1 having $(CH_3)_3Si$—O end groups, or of —Si$(CH_3)H$—O— and —Si$(CH_3)_2$—O— units with a molar ratio of 1:2 having $(CH_3)_3Si$—O end groups.

The ratio of SiH from component (E) to the total number of Si-vinyl-bonded groups in the self-adhesive addition-crosslinking silicone composition is preferably between 0.5 and 5 and more preferably between 0.6 and 1.8.

The adhesion promoter (C) of the general formula (III) is a compound having at least two aliphatically unsaturated groups per molecule. In combination with the cyclic organohydrogenpolysiloxane (B) and optionally with the organopolysiloxane (E), the adhesion promoter (C) enhances the adhesion of the composition further comprising component (A), and so an outstanding strength of adhesion to the desired substrates is achieved with the composition. Moreover, the adhesion promoter (C) and also its hydrolysis products are toxicologically unobjectionable, and the requirements of the FDA and BfR are met.

X is preferably selected at least once per molecule from —C(=O)—, —O—C(=O)—, —O—, NH—C(=O)—, and —NH—C(=O)—O—. In one particularly preferred embodiment, the group X corresponds to —O— and/or —O—C(=O)—.

In one preferred embodiment, the functional groups Y are ethers, esters, carboxylic acids, alcohols, and amides.

The alkyl groups $R^{10}$ have preferably not more than 16, more particularly not more than 12, carbon atoms. The alkenyl groups $R^{10}$ have preferably at least two and not more than 22, more preferably not more than 16, more particularly not more than 12, carbon atoms.

Examples of alkyl groups $R^{10}$ have been given above for $R^1$. Examples of alkenyl radicals $R^{10}$ have been given above for $R^2$.

Preferred embodiments of radicals $R^{10}$ are fatty acid radicals and fatty alcohol radicals such as, for example, the lauryl, myristyl, cetyl, stearyl, arachinyl, ricinolyl, undecylenyl, palmitoleyl, oleyl, erucacyl, linolyl, linolenyl, and arachidonyl radicals.

In the general formula (III) of the adhesion promoter (C), the index n is preferably zero or a positive number not more than 10, more preferably not more than 2 and most preferably 0 or 1.

The indices p and r are preferably zero to 2, more preferably zero or 1.

The index q is preferably zero or 1.

Particularly preferred embodiments of the adhesion promoter (C) are esters of ethylene glycol and glycerol with singly, doubly, or triply unsaturated fatty acids having at least four, more particularly at least 6 and not more than 30, more particularly not more than 20, carbon atoms.

For the activity of the adhesion promoter (C) it is essential that it is employed in combination with the cyclic organohydrogenpolysiloxane (B). Only then, surprisingly, is very good adhesion observed to thermo-plastics, especially those containing bisphenol A.

The hydrosilylation catalyst (D) serves as a catalyst for the addition reaction, termed as a hydrosilylation reaction, between the aliphatically unsaturated hydrocarbon radicals $R^2$ of the diorganopolysiloxanes (A) and the unsaturated groups of the adhesion promoter (C) with the Si-bonded hydrogen atoms of the cyclic organohydrogenpolysiloxanes (B) and, optionally, the organohydrogensiloxanes (E). Many suitable hydrosilylation catalysts are described in the literature. In principle it is possible to use all of the hydrosilylation catalysts corresponding to the prior art that are employed in addition-crosslinking silicone rubber compositions.

As hydrosilylation catalyst (D) it is possible for example to use metals and compounds thereof, such as platinum, rhodium, palladium, ruthenium and iridium, preferably platinum and rhodium. The metals may optionally have been fixed to finely divided support materials such as activated carbon, or metal oxides such as aluminum oxide or silicon dioxide. It is preferred to use platinum and compounds of platinum. Particular preference is given to those platinum compounds which are soluble in polyorganosiloxanes. Soluble platinum compounds which can be used include, for example, the platinum-olefin complexes of the formulae $(PtCl_2 \cdot olefin)_2$ and $H(PtCl_2 \cdot olefin)$, with preference being given to the use of alkenes having 2 to 8 carbon atoms, such as ethylene, propylene, isomers of butene and of octene, or cycloalkenes having 5 to 7 carbon atoms, such as cyclopentene, cyclohexene, and cycloheptene. Other soluble platinum catalysts are the platinum-cyclopropane complex of the formula $(PtCl_2C_2H_6)_2$, the reaction products of hexachloroplatinic acid with alcohols, ethers, and aldehydes and/or mixtures thereof, or the reaction product of hexachloroplatinic acid with methylvinylcyclotetrasiloxane in the presence of sodium bicarbonate in ethanolic solution. Platinum catalysts with phosphorus, sulfur, and amine ligands as well can be used, e.g., $(Ph_3P)_2PtCl_2$. Particularly preferred are complexes of platinum with vinylsiloxanes, such as sym-divinyltetramethyldisiloxane.

The amount of hydrosilylation catalyst (D) used is guided by the desired crosslinking rate and also by economic aspects. It is customary, per 100 parts by weight of diorganopolysiloxanes (A), to use $1 \times 10^{-5}$ to $5 \times 10^{-2}$ parts by weight, preferably $1 \times 10^{-4}$ to $1 \times 10^{-2}$, and more particularly $5 \times 10^{-4}$ to $5 \times 10^{-3}$ parts by weight of platinum catalysts, calculated as platinum metal.

To allow a sufficiently high mechanical strength to be achieved on the part of the crosslinked silicone rubber, it is preferred to incorporate actively reinforcing fillers (F) as a constituent into the addition-crosslinking silicone compositions (S). Actively reinforcing fillers (F) used are, in particular, precipitated and fumed silicas, and also mixtures thereof. The specific surface area of these actively reinforcing fillers ought to be at least 50 $m^2/g$ or be situated preferably in the range from 100 to 400 $m^2/g$ as determined by the BET method. Actively reinforcing fillers of this kind are very well-known materials within the field of the silicone rubbers.

The stated silica fillers may have hydrophilic character or may have been hydrophobized by known processes. When incorporating hydrophilic fillers it is necessary to add a hydrophobizing agent.

The amount of actively reinforcing filler (F) in the silicone compositions (S) is in the range from 0% to 70% by weight, preferably 0% to 50% by weight.

It is additionally possible for inhibitors (G) to be present as a further additive, serving for controlled establishment of the processing time, onset temperature, and crosslinking rate of the silicone compositions (S). These inhibitors (G) are likewise well known within the field of addition-crosslinking compositions. Examples of common inhibitors are acetylenic alcohols such as 1-ethynyl-1-cyclohexanol, 2-methyl-3-butyn-2-ol, 3,5-dimethyl-1-hexyn-3-ol, and 3-methyl-1-dodecyn-3-ol, polymethylvinylcyclosiloxanes such as 1,3,5,7-tetravinyltetramethyltetracyclosiloxane, low molecular mass silicone oils containing $(CH_3)(CHR=CH)SiO_{2/2}$ groups and optionally $R_2(CHR=CH)SiO_{1/2}$ end groups, such as divinyltetramethyldisiloxane and tetravinyl-dimethyldisiloxane, trialkyl cyanurates, alkyl maleates such as diallyl maleates, dimethyl maleate, and diethyl maleate, alkyl fumarates such as diallyl fumarate and diethyl fumarate, organic hydroperoxides such as cumene hydroperoxide, tert-butyl hydroperoxide, and pinane hydroperoxide, organic peroxides, organic sulfoxides, organic amines, diamines and amides, phosphates and phosphites, nitriles, triazoles, diaziridines, and oximes. The effect of these inhibitors (H) is dependent on their chemical structure, and so they must be defined individually.

The amount of inhibitors in the silicone compositions (S) is preferably 0 to 50,000 ppm, more preferably 20 to 2000 ppm, more particularly 100 to 1000 ppm.

The silicone composition (S) may optionally comprise as a constituent further additives (H), preferably in a fraction of preferably up to 70% by weight, more preferably 0.0001% to 40% by weight. These additives may, for example, be inert fillers, quartz, talc, resinous polyorganosiloxanes, dispersing assistants, solvents, other adhesion promoters, pigments, dyes, plasticizers, organic polymers, heat stabilizers, etc. They include additives, such as activated carbon, finely ground quartz, diatomaceous earth, clays, chalk, lithopone, carbon blacks, graphite, metal oxides, metal carbonates, metal sulfates, metal salts of carboxylic acids, metal dusts, fibers, such as glass fibers and plastics fibers, plastics powders, dyes, pigments, etc.

Optionally it is possible to add further constituents (K) which are used in conventional self-adhesive, addition-crosslinking silicone rubber compositions. Such further constituents are preferably organopolysiloxane compounds. Even more preferable are cyclic or linear organopoly-siloxane compounds having at least one SiH group and at least one alkoxysilyl and/or glycidyl group per molecule.

The silicone composition (S) typically contains 100 parts by weight of diorganopolysiloxanes (A) of the general formula (I),
0.1 to 30 parts by weight of at least one cyclic organohydrogenpolysiloxane (B) of the general formula (II),
0.05 to 20 parts by weight of at least one organic adhesion promoter (C) of the general formula (III),
and a catalytic amount of at least one hydrosilylation catalyst (D), and also, optionally,
0.02 to 9 parts by weight of at least one organohydrogenpolysiloxane (E) of the general formula (IV),
0 to 100 parts by weight of at least one reinforcing filler (F),
0 to 5 parts by weight of at least one inhibitor (G), and
0 to 60 parts by weight of further adjuvants (H) and/or (K).

Preference is given to a composition comprising
100 parts by weight of at least one diorganopolysiloxane (A) of the general formula (I),
0.02 to 3 parts by weight of at least one cyclic organohydrogenpolysiloxane (B) of the general formula (II), more preferably 0.1 to 1.5 parts by weight, more particularly 0.1 to 0.9 parts by weight,
0.07 to 6 parts by weight of at least one organic adhesion promoter (C) of the general formula (III), more particularly 0.1 to 2 parts by weight,
a catalytic amount of at least one hydrosilylation catalyst (D),
0.5 to 10 parts by weight of at least one organohydrogenpolysiloxane (E) of the general formula (IV), more preferably 1 to 5 parts by weight,
and also, optionally,
10 to 50 parts by weight of a reinforcing filler (F), more particularly 20 to 45 parts by weight,
0.01 to 0.5 parts by weight of at least one inhibitor (G), more particularly 0.01 to 0.2 parts by weight, and 0 to 60 parts by weight of further adjuvants (H) and/or (K).

The ratio of the total amount of Si—H groups to the total amount of Si-vinyl groups can vary within ranges from 0.5 to 15, with 1.0 to 7 being preferred, and 1.2 to 4.5 being particularly preferred.

The addition-crosslinking silicone composition (S) preferably consists of two components (i) and (ii), where component (i) comprises the constituents (A) and (D) and also, optionally, (C), and component (ii) comprises the constituents (A) and (B), optionally (E), and also optionally (C), it being possible for (C) to be present simultaneously in both parts, but being necessarily present at least in one of the parts, but more preferably being present in part (ii). The constituents (F), (G), (H), and (K) may be present optionally in both components (i) and (ii), with preference being given to the presence of the constituent (F) in both components and also to the presence of the constituent (G) in both or at least in one of the components (i) and (ii).

The addition-crosslinking silicone compositions (S) are compounded by mixing of the above-recited components (i) and (ii) in any order.

The silicone compositions (S) are crosslinked by heating, typically at 40 to 250° C., preferably at not less than 50° C., more preferably at not less than 80° C., preferably at not more than 200° C., and more preferably at not more than 180° C.

Addition-crosslinked silicone elastomers which are prepared from the silicone compositions (S) are also a subject matter of the invention.

A further subject of the invention is a process for preparing addition-crosslinking silicone compositions (S) by mixing the components (A), (B), (C), (D), and optionally (E) with one another.

In one preferred process for preparing the addition-crosslinking silicone compositions (S), the constituents (A), (B), (C), (D), and optionally (E) are divided up in the manner described above between the two components (i) and (ii).

In the process for preparing the silicone compositions (S), the cyclic organohydrogenpolysiloxane (B) is preferably a compound of the general formula (II) with the proviso that the sum of g and h is a number greater than or equal to 5.

In the process for preparing silicone compositions (S), the cyclic organohydrogenpolysiloxane (B) of the general formula (II) is preferably free of aromatic groups.

In the process for preparing silicone compositions (S), the organohydrogenpolysiloxane (E) preferably contains on average 5 to 40 SiH groups.

In the process for preparing silicone compositions (S), the silicone compositions (S) preferably further comprise at least one reinforcing filler (F), at least one inhibitor (G), and also, optionally, other adjuvants (H) and/or (K).

In the process for preparing the silicone compositions (S), the diorganopolysiloxane (A) is preferably mixed with at least one filler (F), which optionally may have been hydrophobized, and this mixture is optionally then mixed with further diorganopolysiloxane (A), organohydrogenpolysiloxane (B) and optionally (E), the hydro-silylation catalyst (D), and optionally further constituents (G), (H), and (K). Mixing here takes place preferably via batch and/or continuous mixing assemblies, such as compounders, dissolvers or planetary mixers, for example.

An additional subject matter of the invention is, moreover, a composite material in which at least part of the composite material consists of an addition-crosslinking silicone elastomer which is produced from the silicone compositions (S) and is joined firmly to at least one substrate material.

A further subject matter of the invention, moreover, is a process for producing composite materials, wherein the silicone compositions (S) are applied to the substrate and subsequently, by heating at 40 to 250° C., are crosslinked to give a composite material.

By vulcanization of the silicone compositions (S) on a substrate or between at least two substrates, the silicone compositions (S) can be joined to the substrates, by application of the silicone compositions (S) to at least one substrate and subsequent crosslinking, preferably by heating, to give a composite material.

The silicone compositions (S) can particularly be employed advantageously wherever there is a desire for good strength of adhesion between the addition-crosslinked silicone elastomer and at least one substrate, preferably consisting of organic plastics, and here in particular engineering and high-performance thermoplastics, such as thermoplastics containing bis-phenol A units (examples being polycarbonates and poly-etherimides), and also polyamides and polyesters, metals or glasses. The substrate may take the form of a molding, film, or coating.

The silicone compositions (S) are suitable for producing composite materials by coating, adhesive bonding, or casting, and for producing molded articles. The silicone compositions (S) are also suitable for the encapsulation and adhesive bonding of electrical and electronic components, and for the production of composite moldings. By composite moldings here is meant a unitary molded article comprising a composite material which is composed of a silicone elastomer part produced from the silicone compositions (S) and at least one substrate, its composition being such there is a strong, durable join between the parts. A composite molding of this kind is preferably produced by processing an organic plastic into a molded article and then joining the silicone composition (S) to this molding and subjecting the system to crosslinking, a procedure which may take place, for example, by injection molding, by extrusion, or in a process known as press vulcanization. Composite materials and more particularly composite moldings may be employed in any of a very wide variety of areas of application, for example in the electronics, household appliance, consumer goods, construction, and automotive industries, in medical engineering, in the production of sporting goods and leisure goods, etc.

The use of a combination of the cyclic organohydrogenpolysiloxane (B) with the SiH-containing crosslinker (E) allows a functional mechanical profile of properties to be maintained; the fraction of the cyclic organohydrogenpolysiloxane (B) must likewise be kept preferably low, if silicone elastomers are to be obtained that have a hardness of more than 60 Shore A.

All above symbols in the above formulae have their definitions in each case independently of one another. In all formulae the silicon atom is tetravalent.

In the examples below, unless otherwise specified in each case,
a) all pressures are reported at 0.10 MPa (abs.),
b) all temperatures are 23° C.,
c) all quantity figures and percentages and parts are indicated as parts by weight.

EXAMPLES

Substrate Materials

The adhesion of the silicone compositions (S) and also of the noninventive addition-crosslinked silicone elastomers was tested on the following substrates:
a) polybutylene terephthalate (PBT): Pocan® B 3235 (Lanxess); containing 30% glass fibers
b) polycarbonate (PC-1): Makrolon® 2405 (Bayer MaterialScience AG)
c) polycarbonate (PC-2): Lexan® 141R (GE Plastics)
d) polycarbonate-polyester blend (PC-3): Xylex® X8303CL (SABIC Innovative Plastics)
e) VA steel (VA) (stainless industrial grade)

Prior to the production of the peel test specimens, the substrate materials for the press vulcanization process and the thermoplastics granules for the injection molding process were dried appropriately in accordance with the manufacturer specifications.

Characterization of the Adhesion

The peel test specimens from the silicone compositions (S) and from the noninventive addition-crosslinking silicone compositions were produced first under laboratory conditions in a press vulcanization process. In addition, further peel test specimens were produced by a two-component injection molding process under real manufacturing conditions, in order to test the adhesion of the silicone compositions (S) to a broad range of different thermoplastic substrate materials.

For production via press vulcanization, a corresponding stainless steel or aluminum mold was employed, into which a substrate, produced preferably by injection molding and with dimensions of 60×25×2 mm, was inserted, and this mold was then filled with the addition-crosslinking silicone composition under test. In order not to falsify the results of the tensile tests by excessive extension of the silicone elastomers, a textile strip was inserted into the silicone composition. Vulcanization was carried out over a time of 3 minutes at a temperature of 120° C. under a compression force of 30 tonnes for the substrate materials PC-1, PC-2, and PC-3, for which there was complete crosslinking of the liquid silicone composition.

For the substrate material VA, vulcanization took place at 180° C. over a period of 10 minutes. Then all of the peel test specimens were cooled to room temperature. The peel test specimen produced in this way, consisting of substrate and a layer of liquid silicone elastomer 2.5 mm thick with inserted textile strip, were stored initially, following removal from the mold, at room temperature for at least 16 hours. Thereafter the peel test specimen was clamped into a tensile testing apparatus and a determination was made of the maximum separation force needed in order to remove the adhering silicone elastomer strip.

The production of a peel test specimen by the 2-component injection molding process was carried out using an injection molding machine having a rotating plate mold in accordance with the prior art. First of all, a thermo-plastic base body was produced, and was conveyed via a rotating plate to the second injection molding assembly. In the subsequent operating step, the silicone composition (S) was injected onto the completed thermo-plastic base body and vulcanized onto the substrate. The injection pressure for self-adhesive addition-crosslinking silicone compositions is typically in the range between 200 to 2000 bar, but in special cases may fall below or above these figures. The injection temperature for self-adhesive addition-crosslinking silicone compositions is typically in the 15 to 50° C. range, it likewise being possible for these temperatures to be undershot or exceeded in individual cases.

The peel test specimens produced by the 2-component injection molding process and employed for assessing the strength of adhesion of the silicone elastomers of the invention to the substrates, are indicated in DIN ISO 813.

Prior to the adhesion test, the peel test specimens produced by way of the 2-component injection molding process were likewise stored at room temperature for at least 16 hours. The adhesion test and the assessment of aspect at fracture took place in the same way as with the peel test specimens from press vulcanization.

The adhesion of the composites consisting of silicone elastomer and thermoplastic base body was quantified along the lines of the adhesion test according to DIN ISO 813. In this case the 90° peel process was carried out in such a way that the angle between substrate and silicone elastomer strip was 90° and the take-off speed was preferably 50 mm/min. The parting force (PF) found was indicated from the ratio of the maximum force N to the width of the specimen in N/mm.

For each example 3-5 laminates were subjected to measurement, the parting force being identified as the average value.

For the compositions of the examples, the following base composition, the stated cyclic organohydrogenpolysiloxanes, and the adhesion promoters AP 1 to AP 6 were used as constituents.

Base Composition (BC):

A commercial laboratory compounder was charged with 232 g of a vinyldimethylsiloxay-terminated polydimethylsiloxane having a viscosity of 20,000 mPa·s (25° C.) and this initial charge was heated to 150° C. and admixed with 159 g of a hydrophobic fumed silica having a specific surface area of 300 m$^2$/g (measured by the BET method) and a carbon content of 3.9-4.2% by weight. This gave a highly viscous composition, which was subsequently diluted with 130 g of the abovementioned polydimethylsiloxane. Compounding under reduced pressure (10 mbar) at 150° C. freed the resultant composition within an hour from water and excess charging residues, especially volatile constituents.

Cyclic Organohydrogenpolysiloxanes 2,4,6,8,10-Pentamethylcyclopentasiloxane (CAS 6166-86-5) was obtained from Sigma-Aldrich Corp.

2,4,6,8,10,12-Hexamethylcyclohexasiloxane (CAS 6166-87-6) was prepared by the method of N. Omura and J. P. Kennedy, *Macromolecules,* 30, 3204 (1997). The compound was obtained via fractional distillation and the purity was checked by means of gas chromatography (GC).

Adhesion Promoters:

The adhesion promoters below were synthesized using methods known to the skilled person (e.g., Organikum, 20th edition, Wiley-VCH GmbH) in accordance with standard procedures.

Adhesion Promoter 1 (AP1) (Inventive):

Ethylene glycol bis(undecylenate) (synthesized from ethylene glycol and undecylenic acid).

Adhesion Promoter 2 (AP2) (Inventive):

Glycerol tris(undecylenate) (synthesized from glycerol and undecylenic acid).

Adhesion Promoter 3 (AP3) (Inventive):

Linseed oil was obtained in natural form from a conventional food market.

Adhesion Promoter 4 (AP4) (Inventive):

Glycerol triundecenyl ether (synthesized from glycerol and 1-bromo-10-undecene).

Adhesion Promoter 5 (AP5) (Not Inventive):

Glycerol tris(stearate) (synthesized from glycerol and stearic acid).

Adhesion Promoter 6 (AP6) (Not Inventive):

Ethyl linolenate (synthesized from ethanol and linolenic acid).

Example 1

Inventive

Preparation of the A Component:

345.8 g of base composition were mixed with 3.5 g of a dimethylvinylsiloxy-endstopped polydimethylsiloxane having methylvinylsiloxy groups, with a vinyl content of 2.5 mmol/g and a viscosity of 350 mm$^2$/s, and 0.7 g of a catalyst solution having a Pt content of 1% by weight, containing a platinum-divinyltetramethyldisiloxane complex in silicone polymer.

Preparation of the B Component:

90 g of base composition were mixed with 0.1 g of 1-ethynyl-1-cyclohexanol, 5.5 g of a vinyldimethylsiloxy-terminated polydimethylsiloxane having a viscosity of 20,000 mPa·s (25° C.), 2.5 g of a copolymer comprising dimethylsiloxy units and methylhydrogensiloxy units in a 2:1 molar ratio, this copolymer being trimethylsiloxy-endstopped and having a viscosity of 100 mPa·s and an Si—H content of 0.5%, 1.5 g of AP 1, and 0.8 g of pentamethylcyclopentasiloxane.

Example 2

Inventive

Component A was prepared in the same way as for example 1. For the B component, 90 g of base composition were mixed with 0.1 g of 1-ethynyl-1-cyclohexanol, 5.5 g of a vinyldimethylsiloxy-terminated polydimethylsiloxane having a viscosity of 20,000 mPa·s (25° C.), 1.8 g of a copolymer comprising dimethylsiloxy units and methyl-hydrogensiloxy units in a 1:1 molar ratio, with trimethylsiloxy end groups and a viscosity of 65 mPa·s and an Si—H content of 0.75%, 1 g of a mixture of pentamethylcyclopentasiloxane and hexamethylcyclohexasiloxane in a 3:2 ratio, and 1.8 g of AP 2.

Example 3

Inventive

Component A was prepared in the same way as for example 1. For the B component, 90 g of base composition were mixed with 0.1 g of 1-ethynyl-1-cyclohexanol, 2.5 g of a vinyldimethylsiloxy-terminated polydimethylsiloxane having a viscosity of 20,000 mPa·s (25° C.), 5.3 g of a copolymer comprising dimethylsiloxy, methyl-hydrogensiloxy, and methylphenylsiloxy groups, and trimethylsiloxy end groups, having a viscosity of 35 mPa·s and an Si—H content of 0.8%, 0.8 g of a mixture of pentamethylcyclopentasiloxane and hexamethylcyclohexasiloxane in a 5:3 ratio, and 1.1 g of AP 3.

Example 4

Inventive

Component A was prepared in the same way as for example 1. For the B component, 90 g of base composition were mixed with 0.1 g of 1-ethynyl-1-cyclohexanol, 2.5 g of a vinyldimethylsiloxy-terminated polydimethylsiloxane having a viscosity of 20,000 mPa·s (25° C.), 5.3 g of a copolymer comprising dimethylsiloxy, methyl-hydrogensiloxy, and methylphenylsiloxy groups, and trimethylsiloxy end groups, having a viscosity of 35 mPa·s and an Si—H content of 0.8%, 1.0 g of a mixture of pentamethylcyclopentasiloxane and hexamethylcyclohexasiloxane in a 1:1 ratio, and 1.8 g of AP 4.

Comparative Example C5

Not Inventive

Component A was prepared in the same way as for example 1. For the B component, 90 g of base composition were mixed with 0.1 g of 1-ethynyl-1-cyclohexanol, 5.5 g of a vinyldimethylsiloxy-terminated polydimethylsiloxane having a viscosity of 20,000 mPa·s (25° C.), 1.8 g of a copolymer comprising dimethylsiloxy units and methyl-hydrogensiloxy units in a 1:1 molar ratio, with trimethylsiloxy end groups and a viscosity of 65 mPa·s and an Si—H content of 0.75%, 1 g of a mixture of pentamethylcyclopentasiloxane and hexamethylcyclohexasiloxane in a 3:2 ratio, and 1.8 g of AP 5.

Comparative Example C6

Not Inventive

Component A was prepared in the same way as for example 1. For the B component, 90 g of base composition were mixed with 0.1 g of 1-ethynyl-1-cyclohexanol, 2.5 g of a vinyldimethylsiloxy-terminated polydimethylsiloxane having a viscosity of 20,000 mPa·s (25° C.), 5.3 g of a copolymer comprising dimethylsiloxy, methyl-hydrogensiloxy, and methylphenylsiloxy groups, and trimethylsiloxy end groups, having a viscosity of 35 mPa·s and an Si—H content of 0.8%, 1.0 g of a mixture of pentamethylcyclopentasiloxane and hexamethylcyclohexasiloxane in a 1:1 ratio, and 1.8 g of AP 6.

Comparative Example C7

Noninventive, Comparative Example

Component A was prepared in the same way as for example 1. For the B component, 90 g of base composition were mixed with 0.1 g of 1-ethynyl-1-cyclohexanol, 6 g of a vinyldimethylsiloxy-terminated polydimethylsiloxane having a viscosity of 20,000 mPa·s (25° C.), 2.7 g of a copolymer comprising methylhydrogensiloxy units and dimethylsiloxy units in a 1:2 molar ratio, and trimethylsiloxy end groups, and with a viscosity of 100 mPa·s and also an Si—H content of 0.5%, and 1 g of a mixture of pentamethylcyclopentasiloxane and hexamethyl-cyclohexasiloxane in a 1:1 ratio.

For the adhesion tests conducted with the addition-crosslinking silicone compositions of examples 1-7, components A and B were each mixed homogeneously in a 1:1 ratio, and the resultant silicone composition was vulcanized in the manner described above onto the respective substrate, by press vulcanization.

For the production of the peel test specimens by injection molding, correspondingly larger amounts of the addition-crosslinking silicone composition from example 2, according to the invention, were prepared, and components A and B were transferred to suitable containers. In accordance with the prior art, these containers were clamped into a suitable metering device of an injection-molding machine, and, in a 2-component injection-molding process, peel test specimens were produced in accordance with DIN ISO 813, consisting of the silicone elastomer of the invention and of the corresponding thermoplastic base body.

The results of the parting force measurements using the addition-crosslinking silicone compositions of the invention from examples 1-7 are reported in table 1:

TABLE 1

| Example | Parting forces in N/mm on stated substrate | | | | |
|---|---|---|---|---|---|
| | PC1 | PC2 | PC3 | PBT | VA |
| 1 | 10.8 | 12.2 | 9.6 | 10.9 | 0.4 |
| 2 | 16.4 | 15.4 | 14.8 | 16.1 | 0.9 |
| 3 | 8.2 | 7.9 | 6.1 | 7.9 | 0.5 |
| 4 | 12.6 | 12.3 | 10.8 | 12.9 | 0.6 |
| C5* | 0.4 | 0.8 | 0.2 | 1.1 | 0.3 |
| C6* | 0.3 | 0.3 | 0.2 | 0.8 | 0.7 |
| C7* | 0.4 | 0.5 | 0.3 | 1.2 | 0.5 |

*not inventive

The invention claimed is:

1. An addition-crosslinking silicone composition comprising:

(A) at least one diorganopolysiloxane of the formula (I)

$$R^1_a R^2_b SiO_{(4-a-b)/2} \quad (I)$$

in which
R$^1$ is a hydroxyl radical or a monovalent, unsubstituted or halogen-substituted hydrocarbon radical having 1 to 20 carbon atoms, which is free of aliphatically unsaturated groups, and optionally contains O, N, S, or P atoms,
R$^2$ is a monovalent, aliphatically unsaturated, unsubstituted or halogen-substituted hydrocarbon radical having 2 to 10 carbon atoms, optionally containing O, N, S, or P atoms, and
b is a value from 0.0001 to 2,
with the proviso that $1.5 < (a+b) \leq 3.0$, and that per molecule there are on average at least two aliphatically unsaturated radicals R$^2$, and that the viscosity of the diorganopolysiloxanes (A) as determined at 25° C. is 1 to 40,000,000 mPa·s, (B) at least one cyclic organohydrogenpolysiloxane of the formula (II), $$(SiHR^7O)_g(SiR^8R^9O)_h \quad (II)$$

where
R$^7$ is hydrogen or has the definition of R$^8$, and
R$^8$ and R$^9$ are, independently
(a) a monovalent aliphatically saturated hydrocarbon radical having 2 to 20 carbon atoms,
(b) an unsubstituted or halogen-substituted monovalent hydrocarbon radical having 6 to 20 carbon atoms, which contains at least one aromatic C$_6$ ring,
(c) a monovalent cycloaliphatic unsubstituted or halogen-substituted hydrocarbon radical having 3 to 20 carbon atoms,
(d) a halogen-substituted, saturated, monovalent hydrocarbon radical having 2 to 20 carbon atoms, which may contain O, N, S, or P atoms, or
(e) a linear, cyclic, or branched radical containing Si atoms, optionally containing one or more Si-bonded hydrogen atoms,
g is a number greater than or equal to 1, and
h is 0 or a positive number,
with the proviso that the sum of g and h is greater than or equal to 4, (C) at least one adhesion promoter of the formula (III)

$$H_{3-p}(XR^{10})_p C \text{---} [C(XR^{10})_q H_{2-q}]_n \text{---} C(XR^{10})_r H_{3-r} \quad (III)$$

where
R$^{10}$ are fatty acid or fatty alcohol radicals having at least four carbon atoms, optionally containing one or more C=C double bonds and functional groups Y,
X is independently selected from —CH$_2$—, —C(=O)—, —O—C(=O)—, —O—, —NH—C(=O)—, and —NH—C(=O)—O—,
Y is independently selected from carbonyl, ethers, esters, carboxylic acids, amides, acid amides, carbamates, ureas, urethanes, and alcohols,
n is 0 or a positive number,
p and r are each 0, 1, 2, or 3, and
q is a number 0, 1, or 2,
with the proviso that the adhesion promoter (C) comprises at least two C=C double bonds, and (D) at least one hydrosilylation catalyst, and (E) at least one organohydrogenpolysiloxane of the formula (IV)

$$R^3_c R^4_d R^5_e H_f SiO_{(4-c-d-2e-f)/2} \quad (IV)$$

where
R$^3$ is a monovalent aliphatically saturated hydrocarbon radical having 1 to 20 carbon atoms,
R$^4$ (a) is a monovalent, unsubstituted or halogen-substituted hydrocarbon radical having 6 to 15 carbon atoms, which contains at least one aromatic C$_6$ ring, or
(b) is a monovalent, unsubstituted or halogen-substituted, saturated hydrocarbon radical having 2 to 20 carbon atoms, in which individual carbon atoms are optionally replaced by O, N, S or P atoms,
R$^5$ is a divalent, unsubstituted or halogen-substituted hydrocarbon radical which is Si-bonded at both ends and has 6 to 20 carbon atoms, and in which individual carbon atoms are optionally replaced by O, N, S, or P atoms, c and f are positive numbers, and d and e are zero or a positive number, with the proviso that the sum (c+d+2e+f) is ≤3, the organohydrogenpolysiloxane (E) contains per molecule on average at least 3 SiH groups, the viscosity of the organohydrogenpolysiloxane (E) as determined at 25° C. is 5 mPa·s to 5000 mPa·s, and that the organohydrogenpolysiloxane (E) is not a cyclic organohydrogenpolysiloxane of the general formula $(SiHR^7O)_g(SiR^8R^9O)_h$.

2. The addition-crosslinking silicone composition of claim 1, wherein the sum of g and h is 5 to 20.

3. The addition-crosslinking silicone composition of claim 1, wherein the cyclic organohydrogenpolysiloxane (B) of the formula (II) is free of aromatic groups.

4. The addition-crosslinking silicone composition of claim 1, wherein an adhesion promoter (C) is an ester of ethylene glycol or glycerol with a singly, doubly, or triply unsaturated fatty acid.

5. The addition-crosslinking silicone composition of claim 1, wherein the indices p, q, and r in the formula (III) are zero or 1.

6. The addition-crosslinking silicone composition of claim 1, wherein the index n in the formula (III) is zero or 1.

7. An addition-crosslinked silicone elastomer prepared by crosslinking the silicone composition of claim 1.

8. A process for preparing an addition-crosslinking silicone composition of claim 1, comprising mixing at least components (A), (B), (C), and (D) with one another.

9. A composite material wherein at least part of the composite material comprises an addition-crosslinking silicone elastomer of claim 1, joined firmly to at least one substrate material.

10. A process for producing composite materials, comprising applying a silicone composition of claim 1 to a substrate, and subsequently crosslinking the silicone composition by heating at 40 to 250° C., to produce a composite material.

11. The addition-crosslinking silicone composition material of claim 1, wherein the adhesion promoter (C) is present in an amount of from 0.05 to 20 parts by weight relative to 100 parts by weight of component (A).

12. The addition-crosslinking silicone composition material of claim 1, wherein the adhesion promoter (C) is present in an amount of from 0.07 to 6 parts by weight relative to 100 parts by weight of component (A).

13. The addition crosslinking composition of claim 1, comprising 100 parts by weight of diorganopolysiloxanes (A) of the general formula (I), 0.1 to 30 parts by weight of at least one cyclic organohydrogenpolysiloxane (B) of the general formula (II), 0.05 to 20 parts by weight of at least one organic adhesion promoter (C) of the general formula (III), and a catalytic amount of at least one hydrosilylation catalyst (D), and also, 0.02 to 9 parts by weight of at least one organohydrogenpolysiloxane (E) of the general formula (IV), 0 to 100 parts by weight of at least one reinforcing filler (F), 0 to 5 parts by weight of at least one inhibitor (G), and 0 to 60 parts by weight of further adjuvants (H) and/or (K).

14. The addition crosslinking composition of claim 1, comprising 100 parts by weight of at least one diorganopolysiloxane (A) of the general formula (I), 0.02 to 3 parts by weight of at least one cyclic organohydrogenpolysiloxane (B) of the general formula (II), more preferably 0.1 to 1.5 parts by weight, more particularly 0.1 to 0.9 parts by weight, 0.07 to 6 parts by weight of at least one organic adhesion promoter (C) of the general formula (III), more particularly 0.1 to 2 parts by weight, a catalytic amount of at least one hydrosilylation catalyst (D), 0.5 to 10 parts by weight of at least one organohydrogenpolysiloxane (E) of the general formula (IV), more preferably 1 to 5 parts by weight, and also, 10 to 50 parts by weight of a reinforcing filler (F), more particularly 20 to 45 parts by weight, 0.01 to 0.5 parts by weight of at least one inhibitor (G), more particularly 0.01 to 0.2 parts by weight, and 0 to 60 parts by weight of further adjuvants (H) and/or (K).

* * * * *